UNITED STATES PATENT OFFICE.

GEORGE H. BECK, OF NEW YORK, N. Y.

WATER LAC VARNISH.

SPECIFICATION forming part of Letters Patent No. 268,172, dated November 28, 1882.

Application filed September 22, 1882. (No specimens.)

*To all whom it may concern:*

Be it known that I, GEORGE H. BECK, of the city, county, and State of New York, have invented a new and useful Water Lac Varnish, being a composition of matter to be used for varnishing wall-paper and for similar purposes, of which the following is a full, clear, and exact description.

My composition consists of the following ingredients, combined in about the proportions stated, viz: ammonia, one hundred and forty grams; shellac, 907.15 grams; water, five thousand grams; gelatine, one hundred and thirty-two grams; glycerine, sixty grams. These ingredients are by preference combined by first putting about one half of the stated quantity of water, together with the whole of the stated quantity of shellac, into a glazed pot and heating the whole to the boiling-point. To this I then add the whole of the ammonia, and continue the boiling a short time until the shellac is all dissolved. In another glazed pot I put the other half of the water and heat it to the boiling-point, and then add to it the gelatine and continue the heat until the gelatine melts. This mixture of water and gelatine is then poured into the pot containing the water, ammonia, and shellac. The whole is then boiled for a few moments until the mass is thoroughly mixed. I then add the glycerine.

When cool the varnish is ready for use, and may be applied to wall-paper by rollers or by a grounding-machine; or it may be applied by hand-brushes, and after being applied it will dry in a very short space of time, and will give to the paper an even, rich, and water-proof leather finish, furnishing a surface that may be washed with warm or cold water.

The varnish now in use for surfacing wall-paper has to be applied by hand-brushes, which is a very slow process, and "shades" always appear on the paper when so varnished. Besides, in passing the brush over the paper, if the paper has been bronzed, the bronzing is liable to be disturbed. With my varnish, when applied with a roller, all of these difficulties are overcome.

By varying the quantity of glycerine the time in which the varnish will dry may be varied to suit the work to be done.

I am aware that it is not new to form a water-varnish by dissolving shellac in an alkaline solution; but What I do claim as new and of my invention is—

The herein-described varnish, consisting of ammonia, shellac, water, gelatine, and glycerine, in about the proportions specified.

GEORGE H. BECK.

Witnesses:
H. A. WEST,
C. SEDGWICK.